United States Patent
Cho et al.

(10) Patent No.: US 8,452,226 B2
(45) Date of Patent: *May 28, 2013

(54) METHOD OF CONTROLLING CONNECTION ESTABLISHMENT IN A WIRELESS NETWORK

(75) Inventors: Hyeon Cheol Cho, Seoul (KR); Beom Jin Jeon, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,030

(22) Filed: Aug. 17, 2012

(65) Prior Publication Data

US 2012/0311164 A1 Dec. 6, 2012

Related U.S. Application Data

(63) Continuation of application No. 12/377,381, filed as application No. PCT/KR2007/006506 on Dec. 13, 2007, now Pat. No. 8,285,198.

(30) Foreign Application Priority Data

Dec. 13, 2006 (KR) .................. 10-2006-0127375

(51) Int. Cl.
*H04H 20/71* (2008.01)
(52) U.S. Cl.
USPC ........................................................ 455/3.01
(58) Field of Classification Search
USPC ........................................................ 455/3.01
See application file for complete search history.

(56) References Cited

U.S. PATENT DOCUMENTS

| | | |
|---|---|---|
| 2003/0073440 A1 | 4/2003 | Mukherjee et al. |
| 2004/0203759 A1 | 10/2004 | Shaw et al. |
| 2005/0096072 A1 | 5/2005 | Rahman et al. |
| 2005/0262530 A1 | 11/2005 | Ruetschi et al. |
| 2006/0209745 A1 | 9/2006 | MacMullan et al. |
| 2006/0212911 A1 | 9/2006 | MacMullan et al. |
| 2007/0270103 A1 | 11/2007 | Kim |
| 2010/0216391 A1 | 8/2010 | Cho et al. |
| 2010/0313082 A1 | 12/2010 | Kim et al. |
| 2010/0315997 A1 | 12/2010 | Kim |

FOREIGN PATENT DOCUMENTS

| | | |
|---|---|---|
| JP | 2003051826 | 2/2003 |
| JP | 2005006327 | 1/2005 |
| WO | 2002052880 | 7/2002 |
| WO | 2002060207 | 8/2002 |
| WO | 20061101801 | 9/2006 |

OTHER PUBLICATIONS

Hitachi Ltd. et al., "High-Definition Multimedia Interface," Specification Version 1.1, May 2004.

*Primary Examiner* — Daniel Rojas
(74) *Attorney, Agent, or Firm* — Lee, Hong, Degerman, Kang & Waimey

(57) ABSTRACT

A method of controlling connection establishment to transmit or receive A/V data in a wireless network is provided. The method of controlling connection establishment to transmit or receive A/V data in a first device of a wireless network that includes a coordinator and at least one device comprises transmitting connection request information required to request connection establishment with a second device and a connection request message which includes capability information of the first device to the second device and receiving a connection response message from the second device in response to the connection request message.

14 Claims, 5 Drawing Sheets

→ High-rate PHY(HRP)
--→ Low-rate PHY(LRP)

METHOD OF CONTROLLING CONNECTION ESTABLISHMENT IN A WIRELESS NETWORK

CROSS-REFERENCE TO RELATED APPLICATIONS

This application is a continuation of U.S. application Ser. No. 12/377,381, filed Feb. 12, 2009, now U.S. Pat. No. 8,285,198, which is the National Stage filing under 35 U.S.C. §371 of International Application No. PCT/KR2007/006506, filed on Dec. 13, 2007, which claims the benefit of earlier filing date and right of priority to Korean Application No. 10-2006-0127375, filed on Dec. 13, 2006, the contents of all of which are hereby incorporated by reference herein in their entirety.

TECHNICAL FIELD

The present invention relates to a wireless communication system, and more particularly, to a method of controlling connection establishment to transmit A/V data in a wireless communication system and a data format for the same.

BACKGROUND ART

Recently, Bluetooth, wireless personal area network (WPAN) technology has been developed, which allows audio or video data to be exchanged between devices by configuring a wireless network between a relatively small number of digital devices in limited places such as homes or small-scaled companies. WPAN can be used to exchange information between a relatively small number of digital devices in a relatively close distance, and enables communication of low power and low cost between digital devices.

FIG. 1 illustrates a configuration example of WPAN. As shown in FIG. 1, the WPAN is a network configured between personal devices within a limited place such as home. The network is configured by direct communication between devices to enable seamless exchange of information between applications. Referring to FIG. 1, the WPAN is comprised of at least two user devices 11 to 15, wherein one of the user devices is operated as a coordinator 11. The coordinator 11 serves to provide basic timing of the WPAN and control quality of service (QoS) requirements. Examples of the user devices include a computer, a PDA, a notebook a computer, a digital TV, a camcorder, a digital camera, a printer, a mike, a speaker, a headset, a barcode reader, a display, and cellular phones. All digital devices can be used as the user devices.

To transmit audio and video (A/V) data streams from a source device to a sink device under the control of a controller in a wireless network which is previously set, connection control between the source device and the sink device is required. Signaling between devices for the connection control should be simplified if possible, so that delay in displaying A/V data, which are transmitted from the source device, through the sink device can be reduced.

DISCLOSURE OF THE INVENTION

Accordingly, the present invention is directed to a method of controlling connection establishment to transmit A/V data in a wireless network and a data format for the same, which substantially obviate one or more problems due to limitations and disadvantages of the related art.

An object of the present invention is to provide a method of simplifying signaling for connection establishment between devices to transmit A/V data in a wireless network.

To achieve these objects and other advantages and in accordance with the purpose of the invention, as embodied and broadly described herein, a method of controlling connection establishment to transmit or receive A/V data in a first device of a wireless network, which includes a coordinator and at least one device, comprises transmitting a connection request message including connection request information necessary for requesting connection establishment with a second device and capability information of the first device to the second device, and receiving a connection response message from the second device in response to the connection request message.

In another aspect of the present invention, a method of controlling connection establishment to transmit A/V data in a source device of a wireless network, which includes a coordinator and at least one device, comprises receiving a connection request message including connection request information necessary for requesting connection establishment and capability information of a sink device from the sink device, performing a bandwidth reservation procedure for allocating channel resources with the coordinator of the wireless network to transmit the A/V data, and transmitting a connection response message to the sink device in response to the connection request message.

In still another aspect of the present invention, a message format for a request of connection establishment between a source device and a sink device in a wireless network, which includes a coordinator and at least one device, comprises a connection request information field region including information necessary for requesting connection establishment with the source device in the sink device, and a capability information field region including information related to capability of the sink device.

In further still another aspect of the present invention, a message format structure for a response of connection establishment between a source device and a sink device in a wireless network, which includes a coordinator and at least one device, comprises a connection response information field region including information necessary for responding to a request of connection establishment with the source device in the sink device, and a data format information field region including information related to capability of the source device.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to a wireless video area network (WVAN) which is a kind of a wireless private access network (WPAN). The WVAN is a network which can provide throughput of 4.5 Gbps or greater to transmit 1080p A/V streams without compression in a close distance within 10 m by using a frequency band of 60 GHz.

Figure 1:
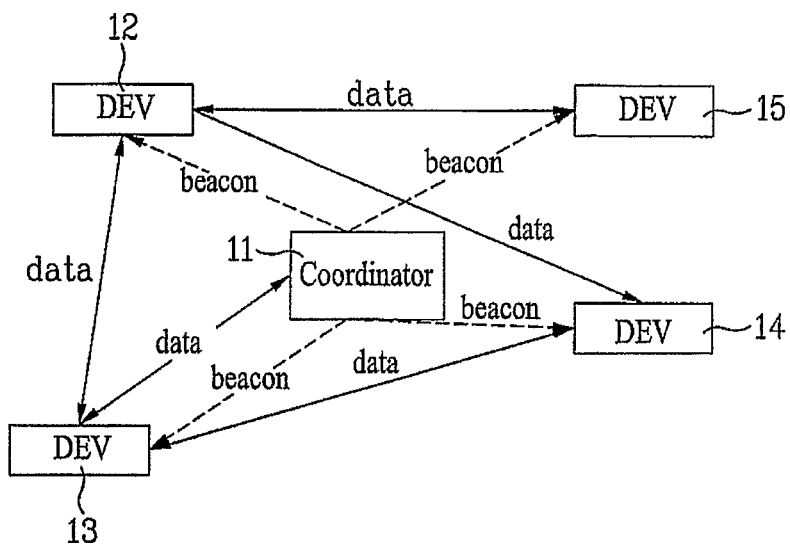
FIG. 1 illustrates a configuration example of WPAN.
Figure 2:
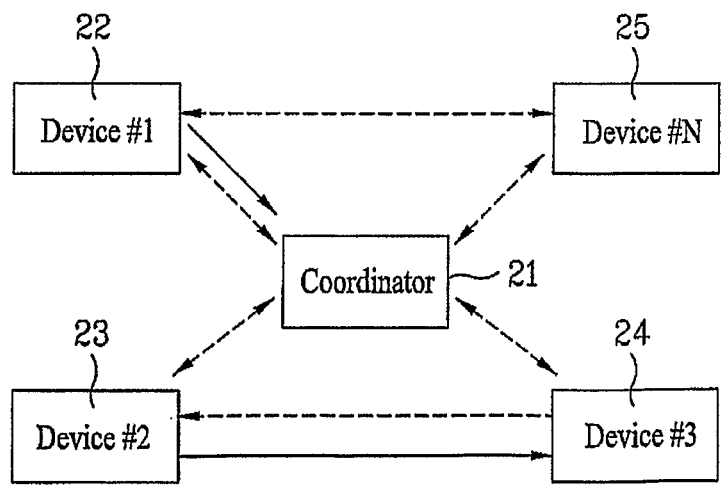
FIG. 2 illustrates a configuration example of WVAN.

FIG. 2 illustrates a configuration example of WVAN. The WVAN includes at least two user devices 21 to 25, wherein one of the user devices is operated as a coordinator 21. The coordinator 21 serves to provide basic timing of the WVAN and control quality of service (QoS) requirements. In other words, the WVAN supports physical layers, i.e., a high-rate physical (HRP) layer and a low-rate physical (LRP) layer. The HRP layer is a physical layer which supports a data transmission speed of 1 Gbps or greater while the LRP layer is a physical layer which supports a data transmission speed of several Mbps. The HRP layer is highly directional, and is used to transmit isochronous data streams, asynchronous data, MAC command, and A/V control data through unicast connection. The LRP layer supports a directional or omni-directional mode, and is used to transmit a beacon, asynchronous data, and MAC command through unicast or broadcast.

Figure 3:
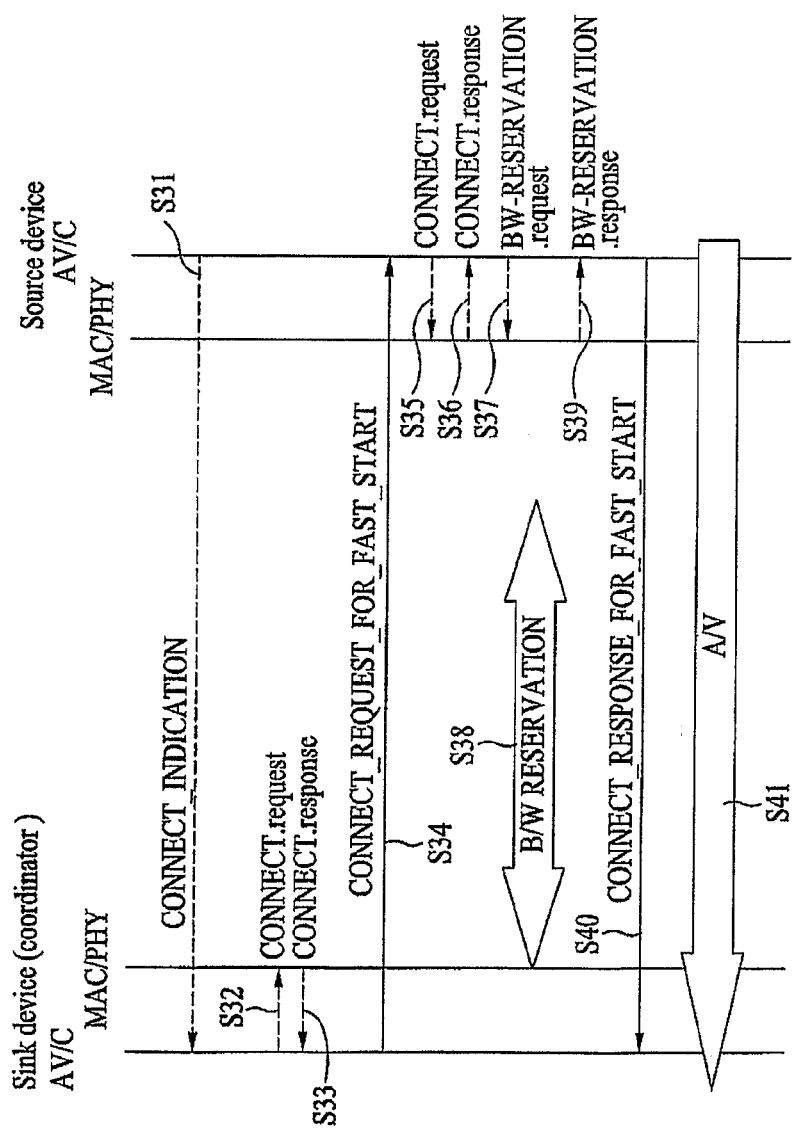
FIG. 3 is a flow chart illustrating a procedure according to the preferred embodiment of the present invention.

FIG. 3 is a flow chart illustrating a procedure according to the preferred embodiment of the present invention, wherein the procedure includes connection establishment for transmitting A/V data streams from a source device to a sink device in a WVAN which is previously set. Although the sink device is operated as a coordinator of the WVAN in the embodiment of FIG. 3, a separate device may be operated as a coordinator. Each device includes protocol layers such as a physical (PHY) layer, a medium access control (MAC) layer, and an AVC layer. The AVC layer controls A/V stream connection between the source device and the sink device by using AVC messages, controls (power on/off, play/stop, etc.) other devices, and controls clock synchronization (pixel clock, audio clock, and synchronization between audio and video).

Referring to FIG. 3, the AVC layer of the sink device receives a CONNECT_INDICATION message from the source device [S31], or spontaneously transmits CONNECT.request primitive to the MAC/PHY layer of the sink device to establish connection with the source device even though it does not receive the CONNECT_INDICATION message [S32]. Also, the AVC layer of the sink device receives CONNECT.response primitive from the MAC/PHY layer in response to the CONNECT.request primitive [S33]. Moreover, the AVC layer of the sink device transmits a connection request message (CONNECT_REQUEST_FOR_FAST_START) to the AVC layer of the source device to request connection establishment with the source device [S34].

Figure 4:
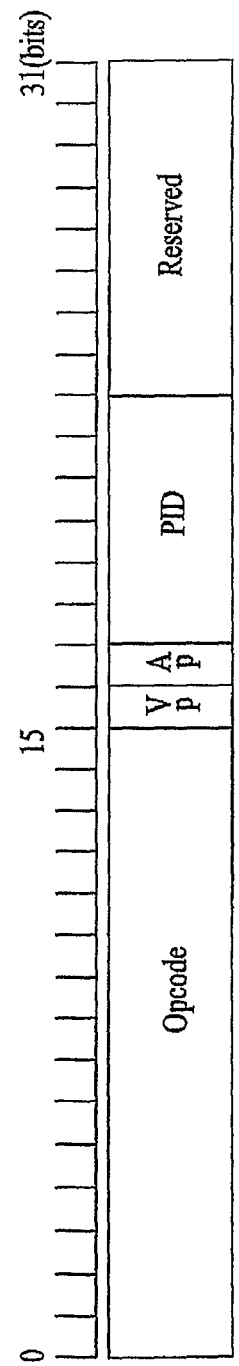
FIG. 4 illustrates an example of a data format of CON-NECT_INDICATION message used in the preferred embodiment of the present invention.

FIG. 4 illustrates an example of a data format of the CONNECT_INDICATION message. The CONNECT_INDICATION message is transmitted from the source device to the sink device if the source device desires to transmit audio data and/or video data (A/V data) to the sink device. In FIG. 4, an 'Opcode' field represents a type of a message, and a 'VP' field is set to '1' if the source device requests a port for video data. The 'VP' field is set to '0' if not so. An 'AP' field is set to '1' if the source device requests a port for audio data. The 'AP' field is set to '0' if not so. A PID field is a field which includes port request ID, and includes different values if the source device requests one sink device of a plurality of ports while the PID field is set to '0' if not so.

The connection request message includes information required for a request of connection establishment with the source device and information for indicating capability of the sink device. Since the A/V data may include various audio formats and various video formats and supportable A/V data formats may be varied depending on devices, the sink device transmits its capability information to the source device while requesting connection with the source device.

Figure 5:
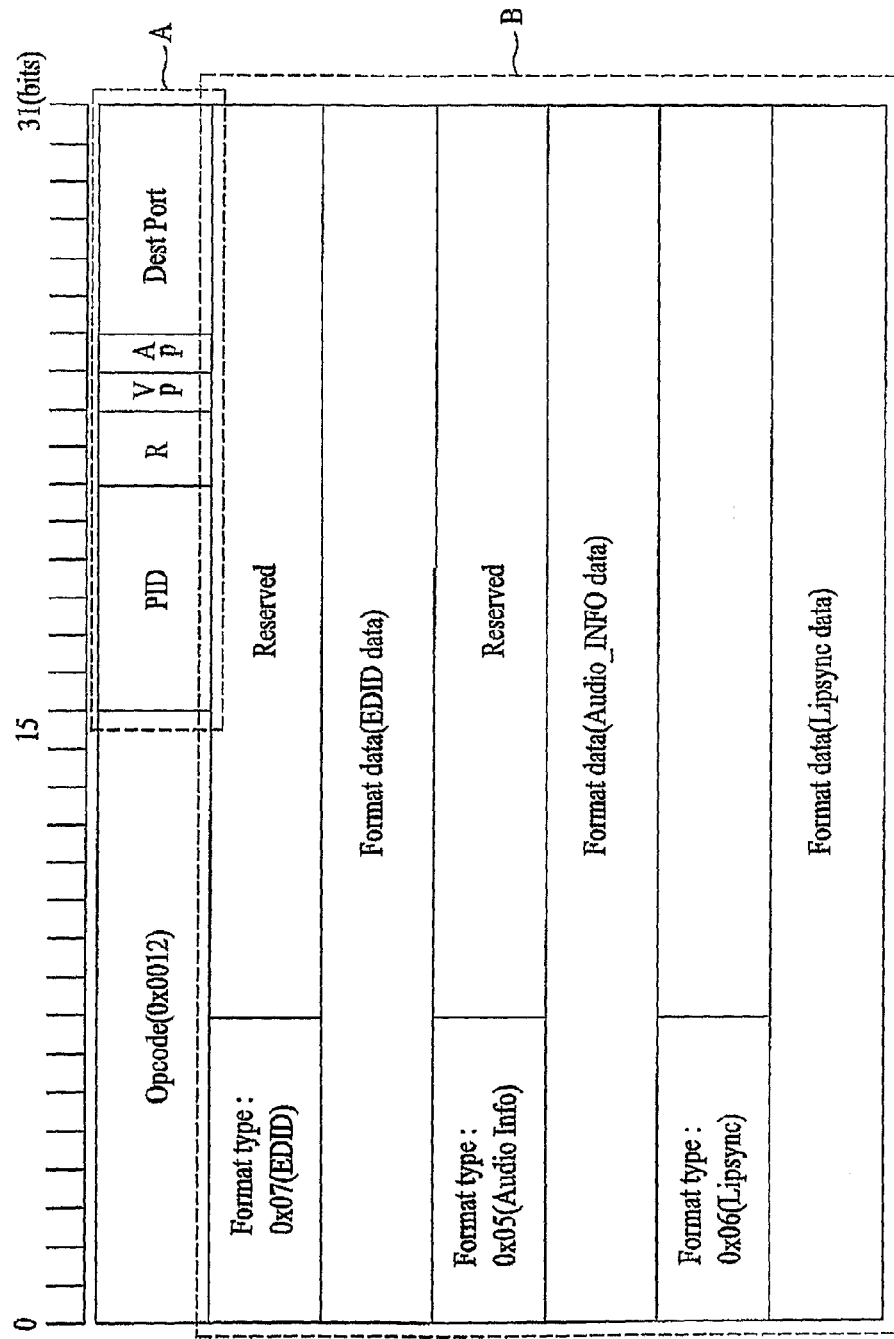
FIG. 5 illustrates an example of a data format of a connection request message transmitted from AVC layer of a sink device to AVC layer of a source device in accordance with the preferred embodiment of the present invention.

FIG. 5 illustrates an example of a data format of a connection request message transmitted from the AVC layer of the sink device to the AVC layer of the source device in accordance with the preferred embodiment of the present invention. In FIG. 5, the connection request message includes an 'Opcode' field representing a type of a corresponding message as an operation code, a connection request information field region 'A' which includes information required for a request of connection establishment with the source device, and a capability information field region 'B' which includes capability information of the sink device. The connection request information field region 'A' includes a PID field, an R field, a VP field, an AP field, and a 'Dest port' field. The capability information field region 'B' includes at least one 'Format type' field and at least one 'Format data' field.

The PID field includes port request ID. If the sink device requests the source device of a plurality of ports, the PID field is set to different values. If the sink device receives the CONNECT_INDICATION message from the source device, the PID field is set to a value included in the received CONNECT_INDICATION message. If not so, the PID field is set to '0.' The R field is a reserved field. The VP field is set to '1' if a destination port is used for video data. The VP field is set to '0' if not so. If the sink device receives the CONNECT_INDICATION message from the source device, the VP field is set to a value included in the received CONNECT_INDICATION message. The AP field is set to '1' if the destination port is used for audio data. The AP field is set to '0' if not so. If the sink device receives the CONNECT_INDICATION message from the source device, the AP field is set to a value included in the received CONNECT_INDICATION message. The 'Dest Port' field is a field which indicates a destination port, and includes port information of the sink device.

The 'Format type' field includes information of a type of data included in the 'Format data' field. In FIG. 5, 'EDID,' 'Audio Info,' and 'Lipsync' are exemplarily illustrated as examples of the 'Format type,' while 'EDID data,' 'Audio_INFO data,' and 'Lipsync data' are exemplarily illustrated as 'Format data' of the respective examples of the 'Format type.' Since the 'Format data' and the 'Format type' are exemplarily illustrated in FIG. 5, the connection request message may include information related to a data format of random video data and/or audio data supported by the sink device.

The AVC layer of the source device transfers a CONNECT.request primitive to the MAC/PHY layer to establish connection with the sink device, and receives CONNECT.response primitive from the MAC/PHY layer in response to the CONNECT.requesst primitive [S36].

The AVC layer of the source device determines a data format of A/V data to be transmitted to the sink device, based on capability information of the sink device, which is included in the connection request message received from the sink device. At this time, the AVC layer of the source device determines a data format of A/V data to be transmitted within the range of capability of the sink device. In other words, the source device should transmit audio and video formats supported by the sink device. If the capacity of A/V data of the source device exceeds capability of the sink device, the source device can change the format of the A/V data to adapt to capability of the sink device.

The AVC layer of the source device transmits a BW-RESERVATION.req primitive to the MAC/PHY layer to command the MAC/PHY layer to perform reservation of a bandwidth based on data format information of the determined A/V data [S37]. The BW-RESERVATION.req primitive includes information of the calculated data rate.

A MAC layer of the source device performs a bandwidth reservation procedure together with a MAC layer of the coordinator [S38]. The source device is allocated with radio resources for transmission of the A/V data from the coordinator by the bandwidth reservation procedure. If the bandwidth reservation procedure successfully ends, the MAC layer of the source device transfers the BW-RESERVATION.rsp primitive to the AVC layer to indicate that the bandwidth has been successfully allocated [S39].

The AVC layer of the source device transmits a connection response message (CONNECT_RESPONSE_FOR_FAST_START) to the AVC layer of the sink device [S40]. The connection response message includes connection response information required for a response to the connection request message and capability information of the source device. The connection response information includes result information of connection establishment and port information of the source device, and the capability information of the source device includes data format information of A/V data that can be supported by the source device.

Figure 6:
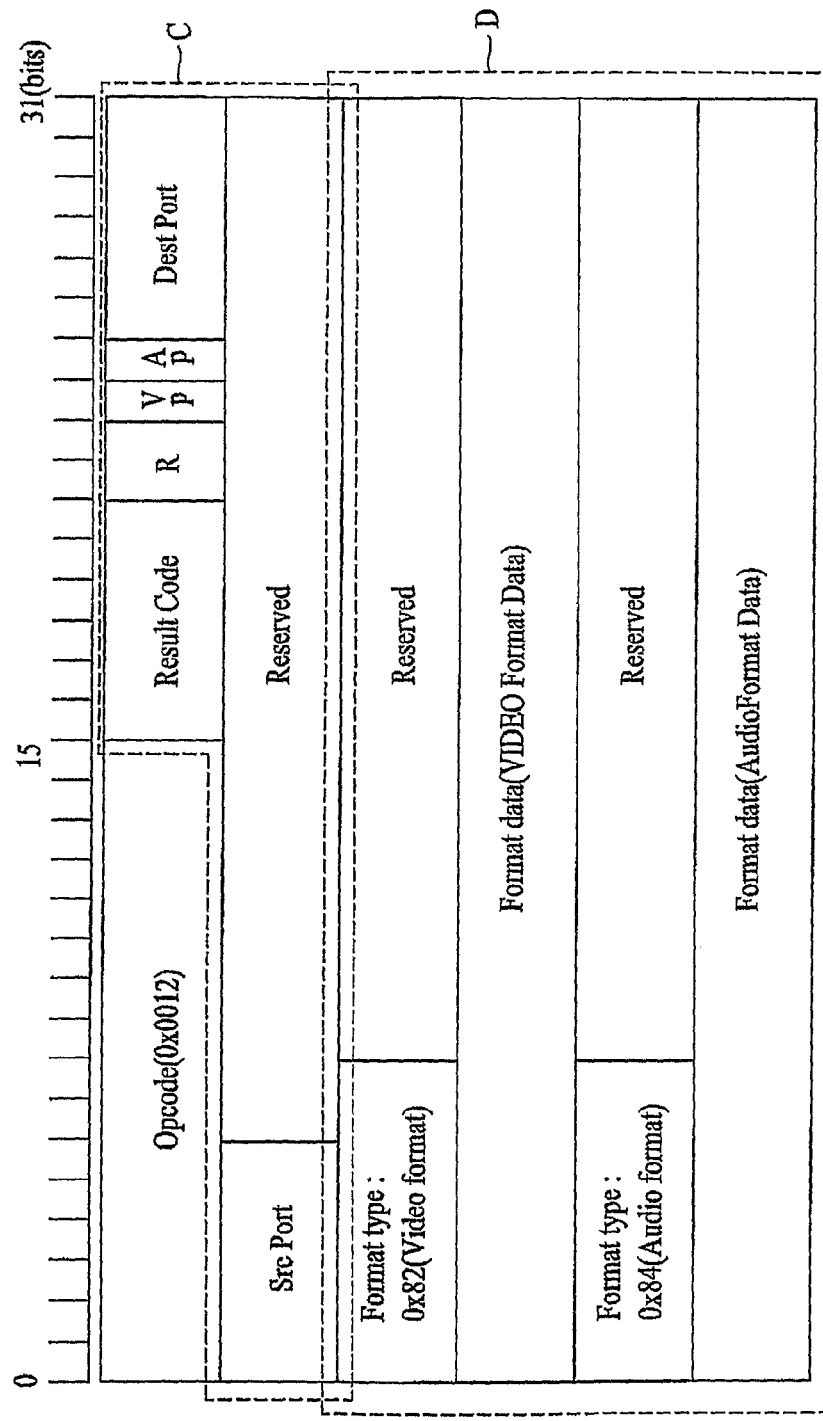
FIG. 6 illustrates an example of a format of a connection response message according to the preferred embodiment of the present invention.

FIG. 6 illustrates an example of a format of the connection response message. In FIG. 6, the connection response message includes an 'Opcode' field, a connection response information field region 'C', and a data format information field region 'D'. The connection response information field region 'C' includes a 'Result Code' field, an R field, a VP field, an AP field, a 'Dest Port' field, and a 'Src Port' field. The data formation information field region 'D' includes at least one 'Format type' field and at least one 'Format data' field as data format information of A/V data that can be supported by the source device.

The VP field, the AP field and the 'Dest Port' field are the same as those described with reference to FIG. 5. The 'Result Code' field is a field which includes the result of connection request, and includes information as to whether connection request has been accepted or rejected. The 'Src Port' field is a field which includes port information of the source device. The 'Format type' field represents a type of information included in the 'Format data' field. The 'Format data' field includes information such as a data format of A/V data that can be transmitted from the source device.

The source device transmits A/V streams to the sink device through channel resources reserved by the bandwidth reservation procedure [S41]. In the embodiment of FIG. 3, the bandwidth reservation procedure (S37 to S39) and the step (S40) of transmitting the connection response message may be performed by varying their order. In other words, the bandwidth reservation procedure may be performed after the source device transmits the connection response message to the sink device.

Meanwhile, unlike the embodiment of FIG. 3, another way of connection control may be considered, in which the source device transmits a connection request message to the sink device to initiate a connection control procedure, and the sink device transmits a connection response message to the source device. In this case, the connection request message includes information for a request of connection establishment and capability information of the source device, while the connection response message includes connection response information and capability information of the sink device. With respect to the other procedures and their detailed description, the embodiment of FIG. 3 can be referred to.

Terminologies used herein may be replaced with other terminologies. For example, the device may be replaced with a user device (or apparatus) or station, the coordinator may be replaced with a coordinating apparatus (or control apparatus), a coordinating device (or control device), a coordinating station (or control station), or piconet coordinator (PNC). Also, although it has been described in the aforementioned embodiments that the technical features of the present invention have been applied to the WVAN, the technical features of the present invention can be applied to a peer-to-peer communication system or other wireless network system.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, it may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, signaling for establishing connection between devices to transmit A/V data in a wireless network can be simplified.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless network system.

The invention claimed is:

1. A method of controlling connection establishment to transmit audio/video (A/V) data in a source device of a wireless network, the wireless network including a coordinator and at least one device and the method comprising:
receiving a connection request message from a sink device, the connection request message comprising connection request information together with capability information of the sink device, the connection request information comprising port information that indicates a sink port via which the A/V data is to be received, the capability information comprising a format data field and a format type field, the format data field comprising format data of the A/V data supportable by the sink device and the format type field comprising a type of the format data; and
transmitting a connection response message to the sink device in response to the connection request message, the connection response message comprising a result of the connection request.

2. The method of claim 1, wherein the connection response message further comprises port information of the source device.

3. The method of claim 2, wherein the connection response message further comprises data format information related to A/V data that can be supported by the source device.

4. The method of claim 3, wherein the connection response message further comprises type information of the data format information.

5. The method of claim 1, further comprising performing a bandwidth reservation procedure with the coordinator for allocating channel resources.

6. The method of claim 5, further comprising transmitting A/V data from the source device by using the channel resources allocated by the coordinator.

7. The method of claim 1, wherein the connection request message further comprises a VP field which indicates whether the sink port is to be used for video data and an AP field which indicates whether the sink port is to be used for audio data.

8. A source device for controlling connection establishment to transmit audio/video (A/V) data in a wireless network, the wireless network including a coordinator and at least one device and the source device configured to:
receive a connection request message from a sink device, the connection request message comprising connection request information together with capability information of the sink device, the connection request information comprising port information that indicates a sink port via which the A/V data is to be received, the capability information comprising a format data field and a format type field, the format data field comprising format data of the A/V data supportable by the sink device and the format type field comprising a type of the format data; and
transmit a connection response message to the sink device in response to the connection request message, the connection response message comprising a result of the connection request.

9. The source device of claim 8, wherein the connection response message further comprises port information of the source device.

10. The source device of claim 9, wherein the connection response message further comprises data format information related to A/V data that can be supported by the source device.

11. The source device of claim 10, wherein the connection response message further comprises type information of the data format information.

12. The source device of claim 8, wherein the source device is further configured to perform a bandwidth reservation procedure with the coordinator for allocating channel resources.

13. The source device of claim 12, wherein the source device is further configured to transmit A/V data by using the channel resources allocated by the coordinator.

14. The source device of claim 8, wherein the connection request message further comprises a VP field which indicates whether the sink port is to be used for video data and an AP field which indicates whether the sink port is to be used for audio data.

* * * * *